United States Patent Office 2,861,890
Patented Nov. 25, 1958

2,861,890

METHOD OF OBTAINING AND UTILIZING EDIBLE MATERIAL FROM VANILLA BEANS AND THE RESULTANT PRODUCT

Raymond R. Lochhead, Chesterfield, Mo., assignor to Angus T. Lochhead, Sr., as trustee No Drawing. Application February 6, 1956
Serial No. 563,409

17 Claims. (Cl. 99—140)

This invention relates to improvements in methods of obtaining and utilizing edible material from vanilla beans. More particularly, this invention relates to improvements in methods of obtaining and utilizing substantially all of the edible material in vanilla beans.

It is therefore an object of the present invention to provide an improved method of obtaining and utilizing substantially all of the edible material in vanilla beans.

In the manufacture of pure vanilla and of pure extracts of vanilla, it is customary to subject vanilla beans to extraction processes; those processes producing edible material having the pleasing and attractive color, flavor and aroma that is characteristic of pure vanilla. That edible material is vanillin plus a number of organic compounds that are resinous or resin-based and are alcohol-water soluble. At the conclusion of those extraction processes, which have become standardized throughout the industry, the processed vanilla beans are considered to be denuded of all of their edible material; and, heretofore, those beans have been considered worthless. The present invention makes processed vanilla beans valuable by making it possible to obtain and utilize additional edible material from those vanilla beans. The principal components of the said additional edible material are vanillin and a number of oily organic compounds; and that additional edible material has a pleasing and attractive color, flavor and aroma, and it can be used in food products. It is therefore an object of the present invention to treat processed vanilla beans to obtain from them additional edible material having a pleasing and attractive color, flavor and aroma.

Presently used methods of extracting edible material from vanilla beans are unsuitable for obtaining additional edible material from processed vanilla beans, because those methods are directed toward the resinous or resin-based alcohol-water soluble organic compounds which, together with vanillin, comprise what is generally referred to as vanilla; whereas the additional edible material in processed vanilla beans comprises, in part, organic compounds that are oily in nature. In contrast to this, the present invention makes it possible to obtain the additional edible material from processed vanilla beans, and it thereby makes it possible to obtain substantially all of the edible material from the vanilla beans; and it does so by exposing the processed vanilla beans to a de-greasing organic solvent in the presence of heat. The temperature of the processed vanilla beans must be kept below the decomposition temperature of the additional edible material in those beans; and it will usually be kept below the boiling point of the solvent. The edible material in the processed vanilla beans will respond to the action of the heat and of the solvent to free itself from those beans; and that material will have a pleasing and attractive color, flavor and aroma.

The de-greasing organic solvent must be readily separable from the additional edible material obtained from the processed vanilla beans; otherwise the separation process or processes, used to separate the additional edible material from the solvent, might impair the pleasing and attractive color, flavor and aroma of that material. The present invention assures ready separation of the solvent from the additional edible material by using a de-greasing organic solvent which has a boiling point that is well below the decomposition temperature of the additional edible material. Such a solvent can be vaporized, and thereby separated from the additional edible material obtained from processed vanilla beans, without any impairment of the pleasing and attractive color, flavor and aroma of that material. It is therefore an object of the present invention to treat processed vanilla beans with a de-greasing organic solvent that has a boiling point which is well below the decomposition temperature of the additional edible material obtained from such beans.

The de-greasing organic solvent must not alter or affect the pleasing and attractive color, flavor and aroma of the additional edible material obtained from processed vanilla beans. Further, that solvent must not leave a residue that could obscure the pleasant and attractive color, flavor and aroma of that additional edible material; instead, that solvent must be fully separable from that additional edible material. In addition, that solvent must not render that additional edible material toxic, and it must not leave a toxic residue.

To be of real value, edible material obtained from vanilla beans must be readily miscible with, or soluble in, food products or vehicles that can be added to food products. If the edible material obtained from vanilla beans is not readily miscible with, or soluble in, food products or vehicles that can be added to food products, the pleasant and attractive flavor and aroma of that material can not be fully detected and appreciated by the ultimate consumer. The resinous or resin-based alcohol-water soluble organic compounds that are part of the edible material presently extracted from vanilla beans are readily miscible with, or soluble in, food products; and hence that edible material can make its flavor and aroma fully available to the ultimate consumer. However, the oily organic compounds that are part of the additional edible material obtained from processed vanilla beans are not readily misible with, or soluble in, many food products. Consequently, even when additional edible material is obtained from processed vanilla beans there is the problem of treating that material so it can make its flavor and aroma fully available to the ultimate consumer. The present invention solves that problem by dispersing the additional edible material, obtained from processed vanilla beans, in shortening, in creamery butter, or in a water-gum solution. The water-gum solution will actually be an emulsion of oil in an aqueous dispersion. Where the additional edible material is dispersed in shortening or butter, that shortening or butter can be substituted for the customary and usual shortening or butter called for in baking and like processes; and that shortening or butter will not only fulfill the function and purpose of customary and usual shortening and butter but it will also carry the additional edible material from processed vanilla beans into, and distribute that material uniformly throughout, the resultant food product. Where the additional edible material is dispersed in the water-gum solution, that solution can be used in lieu of present alcohol extracts of vanilla; and that solution will distribute the additional edible material uniformly throughout the resultant food product. The consequent uniform distribution of the additional edible material throughout the food product makes the full flavor and aroma of that material readily available to the ultimate consumer. It is therefore an object of the present invention to make the flavor and aroma of additional edible material, obtained from processed vanilla beans, fully available to the ultimate consumer by dispersing that material in shortening, in butter, or in a water-gum solution.

The dispersion of the additional edible material, obtained from processed vanilla beans, in shortening or in butter enables the housewife to obtain a distribution of that material throughout the food product that is more thorough and uniform than the distribution she can obtain with liquid vanilla or vanilla extracts. In the first place that additional edible material can be dispersed within the shortening or butter with a degree of thoroughness and completeness beyond the capabilities of the mixing devices and appliances used in the kitchens of homes; and in the second place it is easier to obtain thorough and uniform distribution of a large mass, such as the shortening or butter than a small mass, such as vanilla or vanilla extract. The overall result of dispersing the additional edible material in shortening or butter is to assure optimum distribution of that additional edible material throughout the food products.

The dispersion of the additional edible material, obtained from processed vanilla beans, in shortening or butter is important because the shortening or butter coats that additional edible material with inert oily compounds that will "lock in" the flavor and aroma of that additional edible material. The coating of oily compounds, provided by the shortening or butter, will greatly minimize the loss of flavor and aroma from the additional edible material during storage and shipment; and it will also act to minimize the loss of flavor and aroma from that material during the baking or like process. However, once the baking or like process has been completed, the shortening or butter will not continue to "lock in" the flavor and aroma of the additional edible material obtained from processed vanilla beans and thereby keep that flavor and aroma from being fully detected and appreciated by the ultimate consumer. Instead, that shortening or butter will respond to the baking or like process to free the additional edible material and make its flavor and aroma fully available to the ultimate consumer.

The dispersion of the additional edible material, obtained from processed vanilla beans, in shortening is additionally advantageous because the final product is a yieldable solid rather than a liquid. Such a solid can be packed, stored and shipped in collapsible tubes, whereas a liquid will usually have to be packed, stored and shipped in glass bottles. The collapsible containers are far easier and lighter to handle, and they are far more resistant to breakage than are glass bottles.

The additional edible material, obtained from processed vanilla beans, may be dispersed directly into shortening or butter or it may be hydrogenated and then dispersed into the shortening or butter. The hydrogenation step is desirable because it gives the additional edible material a consistency that is similar to the consistency of the shortening or butter. The result is that the hydrogenated additional edible material is even more resistant to "bleeding" or separating from the shortening or butter than is the un-hydrogenated additional edible material. It is therefore an object of the present invention to hydrogenate the additional edible material obtained from processed vanilla beans.

If the additional edible material obtained from processed vanilla beans is dispersed in a water-gum solution, that material can easily be distributed uniformly throughout the food product by the mixing devices used in the kitchens of homes. As that material is being distributed throughout the food product, it will commingle with and be dissolved by the shortening, butter or other fat in that food product. Consequently, the flavor and aroma of that edible material will be made fully available to the ultimate consumer. This is in contrast to the usual alcohol extracts of vanilla, because those extracts are resinous or resin-based and are not readily dissolved by shortening, butter or other fat. Further, the water-gum solution is far less expensive because it does not require the use of costly alcohol.

To be of real value, the additional edible material obtained from processed vanilla beans must be able to keep its pleasing and attractive flavor and aroma; and it must not turn rancid and develop an objectionable taste or odor. Any loss of the characteristic flavor of the additional edible material would reduce the value of that material; and any rancidity would render that material worthless. However, the additional edible material obtained from processed vanilla beans tends to become rancid. The present invention overcomes this tendency toward rancidity and thereby enables the additional edible material, obtained from processed vanilla beans, to keep its pleasing and attractive flavor and aroma. It is therefore an object of the present invention to enable the additional edible material, obtained from processed vanilla beans, to keep its pleasing and attractive flavor and aroma.

The tendency of the additional edible material, obtained from processed vanilla beans, to become rancid appears to be due to the presence of organic compounds that tend to oxidize. Once oxidized, those organic compounds in the additional edible material quickly render that material worthless. The present invention keeps those organic compounds from oxidizing by adding an anti-oxidant to the additional edible material. Ordinary and usual anti-oxidants are not usable for this purpose because they prevent oxidation by absorbing or consuming oxygen; and to be effective in preventing the oxidation of the organic compounds in the additional edible material, the anti-oxidant must not absorb or consume oxygen. It is therefore an object of the present invention to add to the additional edible material, obtained from processed vanilla beans, an anti-oxidant that does not consume or absorb oxygen.

The anti-oxidant used in practicing the present invention must be of low toxicity in diluted form, and it must not obscure or affect the pleasing and attractive flavor and aroma of the additional edible material obtained from processed vanilla beans. As a result, that anti-oxidant will be able to prevent rancidity of that material without adversely affecting the pleasing and attractive characteristics of that material.

Other and further objects and advantages of the present invention should become apparent from an examination of the following description.

The following description relates to preferred methods provided by the present invention but it is to be understood that the following description is for the purpose of illustration only and does not limit the invention and that the invention will be defined by the appended claims.

In practicing the method of the present invention, the processed vanilla beans are admixed with a solvent which is capable of removing the additional edible material without affecting the color, flavor or aroma of that material. Such a solvent must not affect the color, flavor or aroma of that additional edible material; and it must not leave a residue, after it is stripped away, that would obscure or affect the color, flavor or aroma of that additional edible material. Further, that solvent should be readily separable from the additional edible material obtained from the processed vanilla beans. A number of such solvents are readily available; a few of them being listed hereinafter: diethyl ether, acetone, methylethyl ketone, carbon tetrachloride, ethylene dichloride, trichloroethylene, tetrachloroethylene, hexane and heptane and similar aliphatic hydrocarbons, and benzene. Trichloroethylene and tetrachloroethylene have been found to be particularly useful. Those two solvents have a low degree of inflammability, and they have relatively low boiling points.

The mixture of processed vanilla beans and solvent is maintained at a moderate temperature for an appreciable period of time. Under the action of the heat and of the solvent, the processed vanilla beans will yield additional edible material. This additional edible material has a color, flavor and aroma that is pleasant and attractive; and that material is a pure product of the vanilla bean.

To be usable, that additional edible material must be separated from the solvent; and, preferably, a low temperature stripping process is used. The temperature used must be low enough to avoid appreciable loss of the pleasant and attractive color, flavor and aroma of the additional edible material. A reduced-pressure evaporator has been found to be quite useful in stripping away the solvent.

The additional edible material obtained from the processed vanilla beans contains organic compounds which are readily oxidisable; and when oxidized, those organic compounds seriously affect the flavor and aroma of that material. In fact, the change in flavor and aroma is such that the additional material from the processed vanilla beans can quickly become worthless and unusuable. As nearly as can be determined, the additional edible material in processed vanilla beans contains unsaturated fats that oxidize to aldehydes and ketones which have strong and undesirable odors and flavors. In some instances, the amount of oxidation that occurs overnight is sufficient to render the additional edible material rancid.

The unsaturated fats and other organic compounds in the additional edible material of processed vanilla beans can be kept from oxidizing by the addition of certain anti-oxidants to that material. Ordinary anti-oxidants cannot be used to prevent the oxidation of these organic compounds because those anti-oxidants combine with or absorb oxygen; and eventually the combined or absorbed oxygen, or additional oxygen, will oxidize these organic compounds. However, there are a few anti-oxidants that do not absorb or consume oxygen; examples of which are butylated hydroxy toluene; butylated hydroxy anisole, nordihydroguaiaretic acid, propyl gallate, the tocopherols, and norconidendron. These antioxidants appear to inhibit oxidation by reacting with the free radical intermediates of the oxidizable fat or other organic compound. A number of these anti-oxidants have low toxicity in diluted form, they do not have an objectionable color, flavor, or aroma, they do not adversely affect the pleasant and attractive color, flavor and aroma of the additional edible material from the processed vanilla beans, and they are oil soluble. As a result, these anti-oxidants do not interfere with, or detract from, the ability of the additional edible material to disperse in shortening or butter.

It is entirely practical to select one of these anti-oxidants that is of low toxicity, is free of an objectionable color, flavor or aroma, does not adversely affect the pleasant and attractive color, flavor and aroma of the additional edible material from the processed vanilla bean, and is oil soluble, and then add that anti-oxidant to that additional edible material. However, it is advantageous to add two or more of those anti-oxidants; the plurality of anti-oxidants appearing to make the additional edible material more resistant to oxidation than it is when just one anti-oxidant is added.

It is also helpful to use a synergist in conjunction with the anti-oxidant or anti-oxidants. The synergist does not appear to affect the action of the anti-oxidant or anti-oxidants directly, but it does appear to eliminate trace metal contaminants which could act as catalysts for the oxidation of the organic compounds in the additional edible material. The synergists appear to eliminate the trace metal contaminants by reacting with them to form stable chelates. Some examples of synergists are isopropyl citrate, stearyl citrate, citric acid, sorbitol, monoalkyl ester of citric acid, dialkyl ester of citric acid, polyphosphates, some amino acids, phytic acid, nitrogen coordination compounds, starch phosphates, beta stearoxy tricarbolic acid, and beta palmitoxy tricarbolic acid.

The anti-oxidant must be added to the additional edible material before the oxidizable organic compounds in that material have much of an opportunity to oxidize. That anti-oxidant can be added to the mixture of solvent and processed vanilla beans, it can be added to the resultant liquor, or it can be added to the additional edible material after the solvent has been stripped away. It is preferable to add the anti-oxidant to the mixture of solvent and processed vanilla beans, since such an arrangement protects the oxidizable organic compounds against oxidation from the very instant they are freed from the vanilla beans.

The additional edible material is in liquid form when the solvent is stripped away. Having components that are oily in nature, that material is not too readily miscible with, or soluble in, a number of food products. Accordingly, that material will usually be dispersed in shortening, in butter, or in a water-gum solution. Among the shortenings in which the additional edible material can be dispersed are lard, hydrogenated cotton seed oil, hydrogenated corn oil, hydrogenated soy bean oil, hydrogenated peanut oil, and hydrogenated cocoanut oil. The oily nature of some of the components of the additional edible material facilitates the uniform and thorough distribution of that material in shortening or butter.

If desired, the additional edible material obtained from the processed vanilla beans can be hydrogenated before it is dispersed in the shortening or butter. The hydrogenation gives that material a consistency similar to the consistency of the shortenings or butter in which it will be dispersed. This provides even greater resistance to the "bleeding" or separating of the additional edible material from the shortening or butter.

In one preferred method, ninety (90) pounds of processed vanilla beans were mixed with two hundred (200) pounds of trichloroethylene; and the mixture was heated to a temperature of about one hundred and twenty (120) degrees Fahrenheit. The mixture was held at that temperature for two (2) hours.

The resultant liquid was separated from the processed vanilla beans and was charged into a climbing film evaporator. A reduced pressure was maintained in that evaporator to attain full vaporization of the solvent at reduced temperature; a temperature of about one hundred and eighty (180) degrees Fahrenheit and a pressure of about twelve (12) pounds absolute being used. The separation process required about four and one-half (4½) hours. At the conclusion of the separation process, a total of about nine (9) pounds of additional edible material was recovered.

A mixture of butylated hydroxy anisole and butylated hydroxy toluene was used as an anti-oxidant; and that mixture was added to the mixture of solvent and processed vanilla beans. Only a very small amount of the mixture of butylated hydroxy anisole and butylated hydroxy toluene was needed; the amount added being approximately five hundredths of one percent (0.05%) by weight of the anticipated amount of additional edible material. In the said preferred method, twenty-five ten thousandths (0.0025) of a pound of butylated hydroxy toluene and an equal amount of butylated hydroxy anisole were added.

A synergist such as citric acid was added. In the said preferred method, the amount of citric acid that was added was approximately five hundredths of one percent (0.05%) of the weight of the additional edible material; that amount being five thousandths (0.005) of a pound.

The additional edible material obtained in this manner was admixed with seven hundred and twenty (720) pounds of hydrogenated cottonseed oil. The resultant material was then packed in collapsible tubes.

In another preferred method forty five (45) pounds of processed vanilla beans were mixed with two hundred (200) pounds of tetrachloroethylene; and the mixture was heated to a temperature of about one hundred and forty (140) degrees Fahrenheit. The mixture was held at that temperature for about one (1) hour.

The resultant liquor was separated from the processed vanilla beans and charged into a climbing film evaporator. A pressure of about fifteen (15) pounds absolute and a temperature of about one hundred and eighty five (185) degrees Fahrenheit were maintained for about two (2) hours.

Butylated hydroxy anisole was used as an anti-oxidant. Seven thousandths (0.007) of a pound of the butylated hydroxyl anisole was added to the mixture of processed vanilla beans and the tetrachloroethylene.

The additional edible material obtained in this manner was added to three hundred and sixty (360) pounds of hydrogenated soy bean oil. Other additional edible material obtained by the same method was added to forty five (45) gallons of water-gum solution. That solution was formed by mixing tragacanth and sugar with water; the ratio of the ingredients being one (1) ounce of tragacanth and one half (½) pound of sugar to each gallon of water. The tragacanth is added to the water after that water has been heated, and the water and tragacanth are stirred and agitated until a gel is formed. Thereafter, the sugar is added and stirred to form the required water-gum solution; and then the additional edible material is added. A small amount, approximately four and one half (4½) ounces, of sodium benzoate is added to the solution; and a milliliter of glacial acetic acid is added to provide the requisite acidity. The resulting mixture is agitated vigorously and thoroughly; but it could just as well have been passed through a homogenizer or through a colloid mill. An emulsion is produced in any event.

The ratio of additional edible material to the amount of water in the water-gum solution is not critical. Where the resulting emulsion is to be liquid, about two (2) ounces of additional edible material should be added for each gallon of water. Where the resulting emulsion is to be thick enough to be dispensed from a collapsible tube, four (4) or more ounces of the additional edible material should be added for each gallon of water. Whether it is thin or thick, the resulting emulsion possesses the pleasing and attractive aroma, color and flavor of pure vanilla. Yet, such an emulsion is far less costly than alcohol-water solutions of vanilla. Further, such an emulsion is more desirable, for some purposes, than is a dispersion of additional edible material in shortening or butter. For example, such an emulsion is desirable in the baking of light cakes; and it is equally desirable in other instances where shortening or butter should be used sparingly if at all.

In the above methods, the quantities were stated on the basis that the methods were to be carried out by batch processes. The additional edible material can be obtained from processed vanilla beans by batch processes, but that material will usually be obtained by continuous processes.

The foregoing methods have utilized processed vanilla beans as their starting material. However, raw vanilla beans could just as well be used as the starting material; and where this is done, the customary and usual alcohol extraction will be performed later. It is not critical that the two processes be performed in any particular order; it is only critical that both be performed. Otherwise, a good part of the pure vanilla in the vanilla beans is wasted.

The oily components in the additional edible material obtained by the use of the present invention are more desirable than the alcohol-water soluble resinous or resin-based components of ordinary vanilla because they do not "bake out." The alcohol-water soluble resinous or resin-based components of ordinary vanilla are more readily injured by heat than are the oily components in the additional edible material obtained from processed vanilla beans; and hence they tend to lose a good part of their characteristic color, flavor and aroma during baking and other heating processes. This loss is objectionable because it means that the resultant food product will be lacking in flavor and aroma or that an excess of vanilla must be used. By being more resistant to heat, and thus more resistant to "baking out," the oily components of the additional edible material provided by the present invention assure full flavor and aroma for the resultant food product without any need of an excess of vanilla.

The additional edible material provided by the present invention is far more desirable in the making of natural or imitation ice creams than is the alcohol-water soluble resinous or resin-based material usually referred to as vanilla. Ice creams, and particularly the currently popular imitation ice creams, have water soluble portions and fat-containing portions. The water soluble portions pass quickly through the mouth and pass to the stomach, and their flavor is thus quickly lost. The fat-containing portions, on the other hand, tend to linger in the mouth and on the palate; and it is those portions which provide the after taste. The alcohol-water soluble resinous or resin-based components of ordinary vanilla are not readily absorbed by the fat-containing portions of ice creams, but instead readily become part of the water soluble portions of those ice creams. Hence, when the water soluble portions of ice creams pass quickly to the stomach, those alcohol-water soluble resinous or resin-based components go with them and are lost. However, the oily components of the additional edible material provided by the present invention are readily absorbed by the fat-containing portions of ice creams; and they thus provide a delightful after taste.

It is possible, by reason of the present invention, to provide a mixture of components that will fully flavor both portions of ice creams. The additional edible material of the present invention can be admixed with presently known vanilla; and the resulting mixture will flavor both portions of ice creams. The oily components of the additional edible material will flavor the fat-containing portions of the ice creams, while the resinous or resin-based components of presently known vanilla will flavor the water soluble portions of ice creams. The overall result is the attainment of unusually flavorful and delicious ice creams.

Whereas the foregoing description has described several preferred methods, it should be apparent to those skilled in the art that various changes may be made in the present invention without affecting the scope thereof.

What I claim is:

1. The method of obtaining edible material from vanilla beans that comprises heating a mixture of vanilla beans and a de-greasing solvent to a temperature that is high enough to cause said beans to yield edible material but is low enough to avoid appreciable decomposition of said edible material, separating said solvent from said edible material by heating said solvent and said edible material, adding an anti-oxidant that does not absorb or consume oxygen, hydrogenating the separated edible material, and dispersing said hydrogenated edible material in shortening.

2. The method of obtaining edible material from vanilla beans that comprises heating a mixture of vanilla beans and a de-greasing solvent to a temperature between fifty (50) and one hundred and ninety (190) degrees Fahrenheit, said temperature being high enough to cause said beans to yield edible material but being low enough to avoid appreciable decomposition of said edible material, separating said solvent from said edible material by heating said solvent and said edible material, adding an anti-oxidant that does not absorb or consume oxygen, and hydrogenating the separated edible material.

3. The method of obtaining edible material from vanilla beans that comprises heating a mixture of vanilla beans and a de-greasing solvent to a temperature that is high enough to cause said beans to yield edible material but is low enough to avoid appreciable decomposition of said edible material, separating said solvent from said edible material by heating said solvent and said edible material, and adding an anti-oxidant that does not absorb or consume oxygen, said anti-oxidant being of the group comprising butylated hydroxy toluene, butylated hydroxy anisole, nordihydroguaiaretic acid, propyl gallate, the tocopherols, and norconidendron.

4. The method of obtaining edible material from vanilla beans that comprises heating a mixture of vanilla beans and a de-greasing solvent to a temperature that is high enough to cause said beans to yield edible material but is low enough to avoid appreciable decomposition of said edible material, separating said solvent from said edible material by heating said solvent and said edible material, and adding an anti-oxident that does not absorb or consume oxygen, said anti-oxidant being added prior to the conclusion of the step wherein said solvent is separated from said edible material.

5. The method of obtaining edible material from vanilla beans that comprises heating a mixture of vanilla beans and a de-greasing solvent to a temperature that is high enough to cause said beans to yield edible material but is low enough to avoid appreciable decomposition of said edible material, separating said solvent from said edible material by heating said solvent and said edible material, adding an anti-oxidant that does not absorb or consume oxygen, and dispersing said edible material in a fat.

6. The method of obtaining edible material from vanilla beans that comprises heating a mixture of vanilla beans and a de-greasing solvent to a temperature that is high enough to cause said beans to yield edible material but is low enough to avoid appreciable decomposition of said edible material, separating said solvent from said edible material by heating said solvent and said edible material, adding an anti-oxidant that does not absorb or consume oxygen, and dispersing said edible material in a water-gum solution.

7. The method of obtaining edible material from vanilla beans that comprises heating a mixture of vanilla beans and a de-greasing solvent to a temperature that is high enough to cause said beans to yield edible material but is low enough to avoid appreciable decomposition of said edible material, separating said solvent from said edible material by heating said solvent and said edible material, adding an anti-oxidant that does not absorb or consume oxygen, and adding a synergist that can react with trace metal contaminants to keep said trace metal contaminants from fostering oxidation of said edible material.

8. The method of obtaining edible material from vanilla beans that comprises heating a mixture of vanilla beans and a de-greasing solvent to a temperature that is high enough to cause said beans to yield edible material but is low enough to avoid appreciable decomposition of said edible material, separating said solvent from said edible material by heating said solvent and said edible material, and adding a mixture of anti-oxidants that do not absorb or consume oxygen.

9. The method of obtaining edible material from vanilla beans that comprises hating a mixture of vanilla beans and a de-greasing solvent to a temperature that is high enough to cause said beans to yield edible material but is low enough to avoid appreciable decomposition of said edible material, separating said solvent from said edible material, and protecting said edible material against rancidity by adding an anti-oxidant that does not absorb or consume oxygen.

10. The method of obtaining edible material from vanilla beans that comprises mixing vanilla beans and a de-greasing solvent, separating said solvent from said edible material, and adding an anti oxidant that does not absorb or consume oxygen.

11. The method of obtaining edible material from vanilla beans that comprises mixing vanilla beans and a de-greasing solvent in the presence of heat to cause said beans to yield edible material, separating said solvent from said edible material, and adding an anti-oxidant that does not absorb or consume oxygen.

12. The method of obtaining edible material from vanilla beans that comprises mixing vanilla beans and a de-greasing solvent to cause said beans to yield edible material, separating said solvent from said edible material, and adding an anti-oxidant that does not absorb or consume oxygen, said anti-oxidant being added prior to the conclusion of the step wherein said solvent is separated from said edible material.

13. The method of obtaining and utilizing edible material from vanilla beans that comprises mixing an anti-oxidant with solvent-extracted edible material of the vanilla bean, said anti-oxidant not consuming or absorbing oxygen.

14. A stable, edible, pleasing and attractive material having the characteristics of vanilla that comprises a solvent-extracted material of the vanilla bean and an anti-oxidant that does not absorb or consume oxygen.

15. A stable, edible, pleasing and attractive material having the characteristics of vanilla that comprises a solvent-extracted material of the vanilla bean and an anti-oxidant that does not absorb or consume oxygen, said anti-oxidant being of the group comprising butylated hydroxy toluene, butylated hydroxy anisole, nordihydroguaiaretic acid, propyl gallate, the tocopherols, and norconidendron.

16. A stable, edible, pleasing and attractive material having the characteristics of vanilla that comprises a solvent-extracted material of the vanilla bean, and an anti-oxidant that does not absorb or consume oxygen, said material having some components that are oily in nature.

17. A stable, edible, pleasing and attractive material having the characteristics of vanilla that comprises a solvent-extracted material of the vanilla bean, and an anti-oxidant that does not absorb or consume oxygen, said material being dispersed in fat.

References Cited in the file of this patent

UNITED STATES PATENTS

| | | |
|---|---|---|
| 931,805 | Sheehan | Aug. 24, 1909 |
| 1,285,555 | Bradley | Nov. 19, 1918 |
| 1,324,538 | Boyles | Dec. 9, 1919 |
| 2,511,803 | Hall | June 13, 1950 |
| 2,523,127 | Lundberg | Sept. 19, 1950 |
| 2,657,997 | Rusoff et al. | Nov. 3, 1953 |

OTHER REFERENCES

"Vanilla Extract," by Dean et al., The Journal of Industrial and Engineering Chemistry, August 1916, vol. 8, No. 8, pp. 703 and 704.